(12) United States Patent
Steinmann

(10) Patent No.: US 9,944,824 B2
(45) Date of Patent: Apr. 17, 2018

(54) GAS-EMISSION-REDUCED SILICONE GEL

(71) Applicants: ELANTAS GMBH, Wesel (DE);
Andreas Steinmann, Hamburg (DE)

(72) Inventor: Andreas Steinmann, Hamburg (DE)

(73) Assignees: ELANTAS GMBH, Wesel (DE);
ANDREAS STEINMANN, Hamburg (DE)

( * ) Notice: Subject to any disclaimer, the term of this patent is extended or adjusted under 35 U.S.C. 154(b) by 250 days.

(21) Appl. No.: 14/913,642

(22) PCT Filed: Aug. 21, 2014

(86) PCT No.: PCT/EP2014/002292
§ 371 (c)(1),
(2) Date: Feb. 22, 2016

(87) PCT Pub. No.: WO2015/024660
PCT Pub. Date: Feb. 26, 2015

(65) Prior Publication Data
US 2016/0200940 A1 Jul. 14, 2016

(30) Foreign Application Priority Data
Aug. 23, 2013 (DE) ........................ 10 2013 013 984

(51) Int. Cl.
*C09D 183/04* (2006.01)
*C08L 83/04* (2006.01)
*C08K 5/04* (2006.01)
*C01G 23/07* (2006.01)
*B01J 31/16* (2006.01)
*C08G 77/12* (2006.01)
*C08G 77/20* (2006.01)
*C08K 3/22* (2006.01)

(52) U.S. Cl.
CPC ........ *C09D 183/04* (2013.01); *B01J 31/1608* (2013.01); *C01G 23/07* (2013.01); *C08L 83/04* (2013.01); *B01J 2231/323* (2013.01); *B01J 2531/828* (2013.01); *C01P 2002/54* (2013.01); *C01P 2004/64* (2013.01); *C01P 2006/11* (2013.01); *C01P 2006/12* (2013.01); *C08G 77/12* (2013.01); *C08G 77/20* (2013.01); *C08K 2003/2241* (2013.01)

(58) Field of Classification Search
None
See application file for complete search history.

(56) References Cited

U.S. PATENT DOCUMENTS

| 4,189,545 | A | 2/1980 | Modic |
| 5,571,853 | A | 11/1996 | Ikeno et al. |
| 5,672,330 | A * | 9/1997 | Hartmann .............. B01J 21/063 423/610 |
| 7,829,648 | B2 | 11/2010 | Tanaka et al. |
| 2004/0203268 | A1 * | 10/2004 | Nishizawa .............. C08L 83/04 439/91 |
| 2004/0253436 | A1 * | 12/2004 | Heeks ..................... B32B 25/20 428/328 |
| 2005/0250903 | A1 | 11/2005 | Tanaka et al. |
| 2010/0046989 | A1 * | 2/2010 | Anan ................. G03G 15/0818 399/286 |

FOREIGN PATENT DOCUMENTS

| DE | 2906214 A1 | 9/1979 |
| DE | 20121446 U1 | 11/2002 |
| JP | 2003-55553 A | 2/2003 |
| WO | WO 02/058641 A1 | 8/2002 |

OTHER PUBLICATIONS

Chen et al., "Titanium Dioxide Nanomaterials: Synthesis, Properties, Modifications, and Applications," Chemical Reviews, vol. 107, No. 7, 2007 (Published on Web Jun. 23, 2007), pp. 2891-2959, XP55002733.
Database WPI Week 200426, Thomson Scientific, London, GB; AN 2004-272420, 2004, XP-002731730, 3 pages.
Evonik Industries, "Aeroxide $TiO_2$ P 25 Hydrophilic Fumed Titanium Dioxide," Aerosil Product Information, Feb. 2007, 2 pages.
International Search Report (Form PCT/ISA/210) for International Application No. PCT/EP2014/002292, dated Nov. 4, 2014.

* cited by examiner

*Primary Examiner* — Marc S Zimmer
(74) *Attorney, Agent, or Firm* — Birch, Stewart, Kolasch & Birch, LLP

(57) ABSTRACT

The invention relates to compositions which contain polyorganosiloxanes, a hydrosilylation catalyst, an inhibitor or moderator and doped pyrogenic titanium dioxide, to the use thereof for applying protective coatings to an electrical or electronic component or device and to the protective coatings as such.

16 Claims, 3 Drawing Sheets

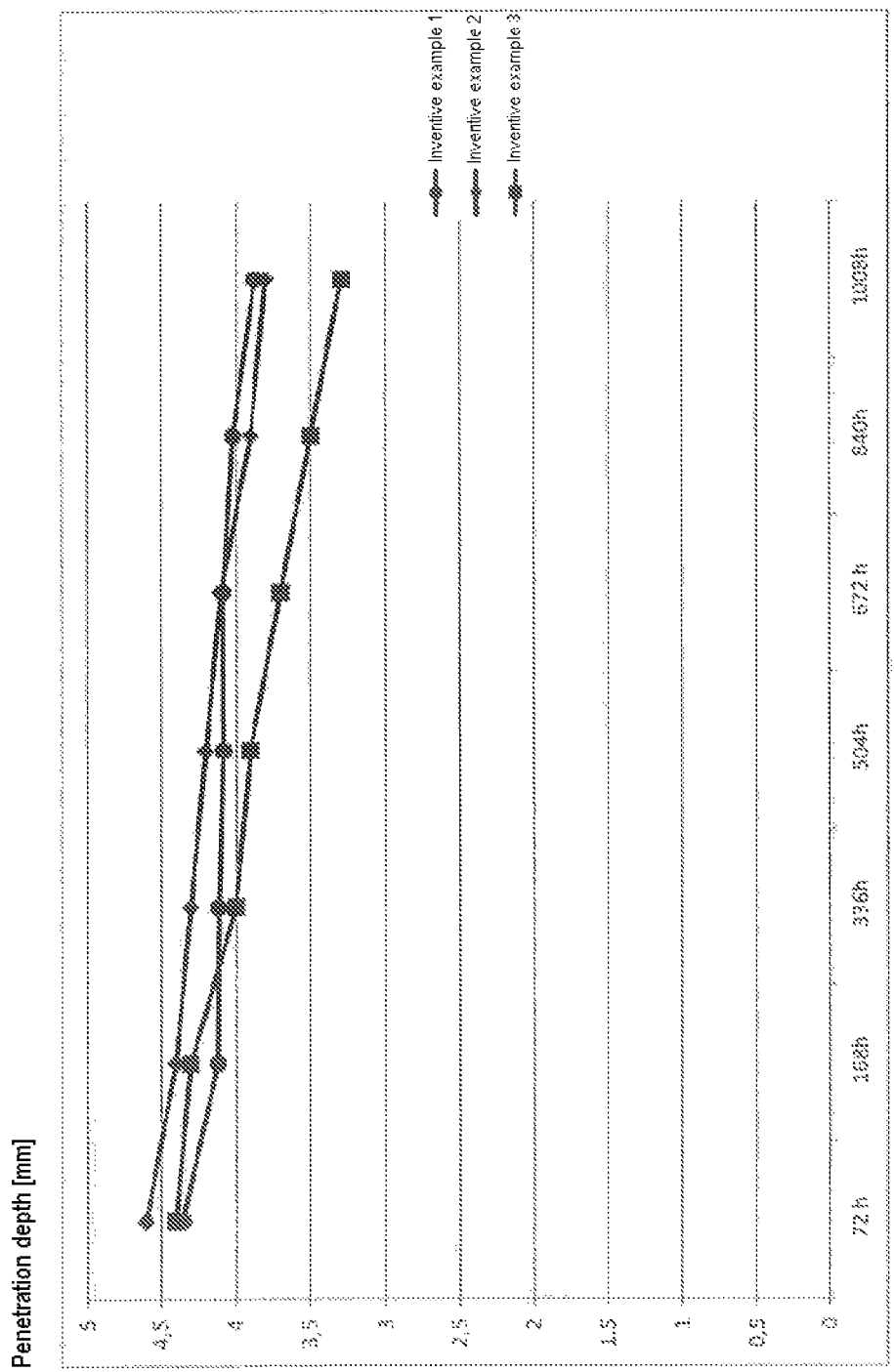

GAS-EMISSION-REDUCED SILICONE GEL

The invention relates to compositions comprising polyorganosiloxanes, a hydrosilylation catalyst, an inhibitor or moderator, and doped pyrogenic titanium dioxide, use of these for the application of protective coatings to an electrical or electronic component or device, and also the protected coatings per se.

It has long been known that there are silicone gels which comprise polyorganosiloxanes containing alkenyl groups, e.g. vinyl-group-terminated polydimethylsiloxanes, and which comprise polyorganohydrosiloxanes, and which are crosslinked with use of a hydrosilylation catalyst.

However, at temperatures above 150° C. these silicone gels are subject to oxidative degradation which in the case of siloxane polymers containing methyl groups leads to emission of gas which comprises carbon monoxide and formaldehyde.

U.S. Pat. No. 5,571,853 describes a silicone gel for the protection of electrical and electronic components with low modulus of elasticity and nevertheless good flexibility. The silicone gel described in that document comprises a vinyl-group-terminated polydimethylsiloxane, an unfunctionalized dimethylsiloxane, an organohydropolysiloxane, and a hydrosilylation catalyst.

U.S. Pat. No. 7,829,648 describes a soft silicone gel with low modulus of elasticity which does not bleed. It comprises a polysiloxane containing alkenyl groups, an organohydropolysiloxane, and a platinum catalyst.

There are no silicone gels known hitherto having reduced gas emission due to suppression of oxidative degradation at high temperature.

It is therefore an object of the invention to provide a silicone gel formulation which is suitable for use at temperatures markedly above 150° C. without any resultant liberation of detrimental gaseous decomposition products.

The object is achieved via a composition comprising
a) from 30 to 99.799989% by weight of at least one linear or branched polyorganosiloxane comprising at least two alkenyl or alkynyl groups, as component A;
b) from 0.1 to 30% by weight of at least one linear or branched polyorganosiloxane comprising at least 3 Si—H groups, as component B;
c) from 0.000001 to 1% by weight of at least one hydrosilylation catalyst as component C;
d) from 0.00001 to 5% by weight of at least one inhibitor or moderator selected from the groups D1 and D2, as component D:
  D1: organic compounds having at least one alkynyl group and at least one hydroxy group;
  D2: acyclic or cyclic organosiloxanes having from 1 to 5 Si atoms, comprising at least two alkenyl groups;
e) from 0.1 to 30% by weight of at least one doped pyrogenic titanium dioxide as component E,
f) from 0 to 69.799989% by weight of one or more linear or branched polyorganosiloxanes comprising two terminal Si—H groups or one terminal Si—H group and one terminal alkenyl group, as component F;
g) from 0 to 69.799989% by weight of one or more other linear or branched polyorganosiloxanes as component G;
h) from 0 to 10% by weight of one or more additives as component H;
where the entirety of components A to H gives 100% by weight.

Surprisingly, it has been found that the addition of doped pyrogenic titanium dioxide, in particular iron-doped pyrogenic titanium dioxide, to an organosiloxane formulation which can be hardened to give a gel or a coating suppresses oxidative degradation of the organopolysiloxane, and thus reduces emission of gaseous decomposition products.

Surprisingly, it has also been found here that liberation of gaseous decomposition products increases with increasing content of component E, although the latter suppresses liberation of the gaseous decomposition products. It is therefore advantageous to keep the content of component E low. If, in contrast, an undoped pyrogenic titanium dioxide is used instead of component E, the degradation-inhibiting effect increases with the quantity therefore added to the polyorganosiloxane.

The suppression of oxidative degradation of the polyorganosiloxane mixture, and therefore of liberation of gaseous degradation products, was determined via measurement of the increase in hardening of the silicone surface during storage at a temperature markedly above 150° C. This is possible because the oxidative degradation of the polyorganosiloxane mixture results in production of inorganic silicon dioxide which has higher hardness than the polyorganosiloxane mixture.

FIG. 3 is a diagram in which the penetration depth in inventive examples 1 to 3 during storage at 206° C. is plotted against storage time.

Figure 1:
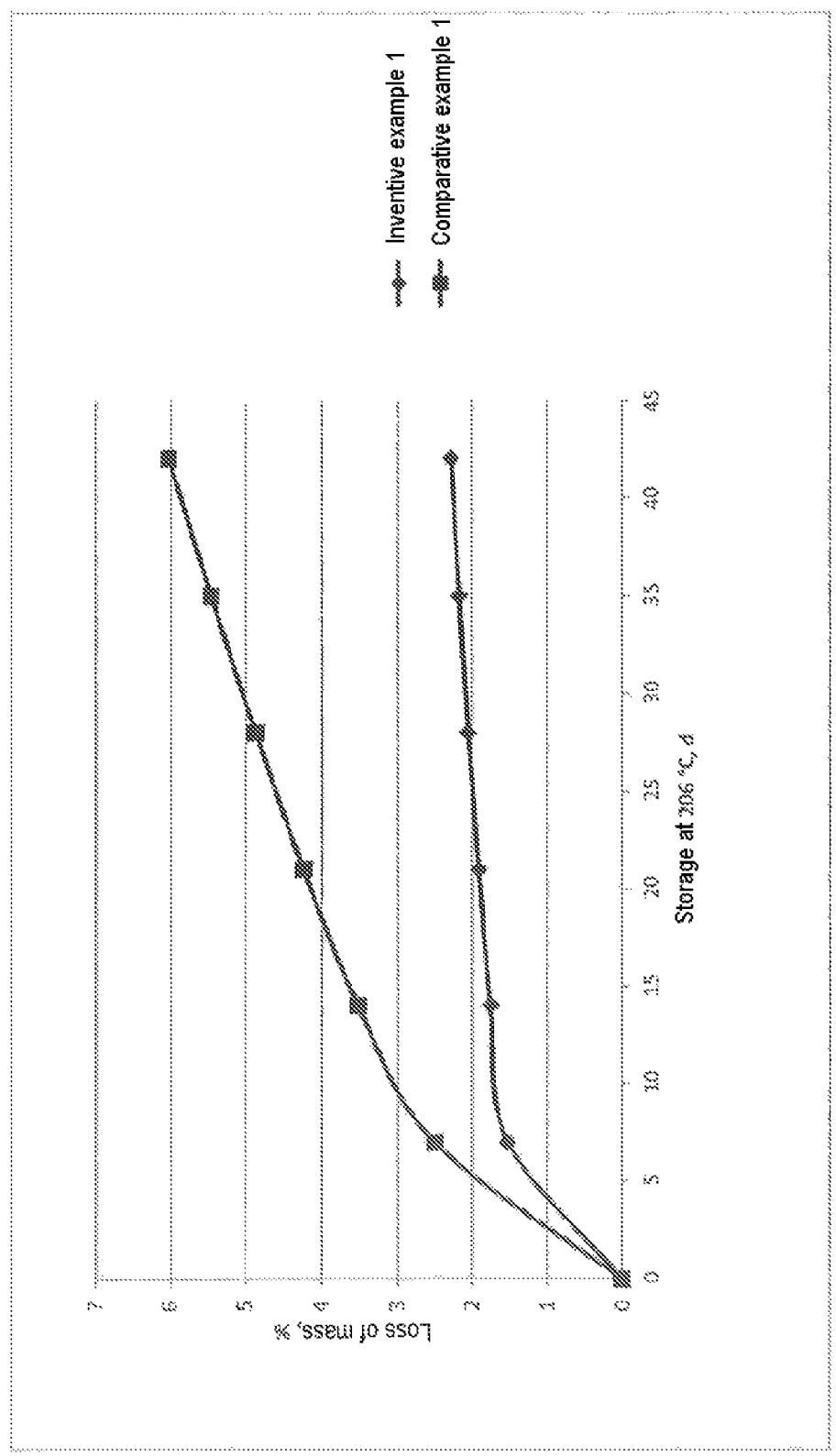
FIG. 1 is a diagram in which the loss of mass in inventive example 1 and comparative example 1 during storage at 206° C. is plotted against storage time.

In one preferred embodiment the composition of the invention comprises
a) from 50 to 99.69899% by weight of component A;
b) from 0.2 to 15% by weight of component B;
c) from 0.00001 to 1% by weight of component C;
d) from 0.001 to 3% by weight of component D;
e) from 0.1 to 10% by weight of component E;
f) from 0 to 49.69899% by weight of component F;
g) from 0 to 49.69899% by weight of component G;
h) from 0 to 10% by weight of component H;
where the entirety of components A to H gives 100% by weight.

In one particularly preferred embodiment the composition of the invention comprises
a) from 80 to 99.5899% by weight of component A;
b) from 0.2 to 10% by weight of component B;
c) from 0.0001 to 0.5% by weight of component C;
d) from 0.01 to 2% by weight of component D;
e) from 0.2 to 5% by weight of component E;
f) from 0 to 19.5899% by weight of component F;
g) from 0 to 19.5899% by weight of component G;
h) from 0 to 10% by weight of component H;
where the entirety of components A to H gives 100% by weight.

In one preferred embodiment the composition of the invention comprises from 34 to 99.799989% by weight of component A, from 0 to 65.799989% by weight of component F, and from 0 to 65.799989% by weight of component G.

In one particularly preferred embodiment the composition of the invention comprises from 34 to 99.799989% by weight of component A, 0% by weight of component F, 0% by weight of component G, and 0% by weight of component H.

In one particularly preferred embodiment the composition of the invention consists of components A, B, C, D, and E, where the entirety of components A to E gives 100% by weight.

In one specifically preferred embodiment the composition of the invention comprises
a) from 34 to 99.799989% by weight of component A;
b) from 0.1 to 30% by weight of component B;
c) from 0.000001 to 1% by weight of component C;
d) from 0.00001 to 5% by weight of component D;
e) from 0.1 to 30% by weight of component E;
f) from 0 to 65.799989% by weight of component F, in particular 0% by weight of component F;
g) from 0 to 65.799989% by weight of component G, in particular 0% by weight of component G;
h) from 0 to 10% by weight of component H, in particular 0% by weight of component H;
where the entirety of components A to H gives 100% by weight.

In an embodiment to which particular preference is further given the composition of the invention comprises
a) from 71 to 99.69899% by weight of component A;
b) from 0.2 to 15% by weight of component B;
c) from 0.00001 to 1% by weight of component C;
d) from 0.001 to 3% by weight of component D;
e) from 0.1 to 10% by weight of component E;
f) from 0 to 28.69899% by weight of component F, in particular 0% by weight of component F;
g) from 0 to 28.69899% by weight of component G, in particular 0% by weight of component G;
h) from 0 to 10% by weight of component H, in particular 0% by weight of component H;
where the entirety of components A to H gives 100% by weight.

In a very particularly preferred embodiment the composition of the invention comprises
a) from 82.5 to 99.5899% by weight of component A;
b) from 0.2 to 10% by weight of component B;
c) from 0.0001 to 0.5% by weight of component C;
d) from 0.01 to 2% by weight of component D;
e) from 0.2 to 5% by weight of component E;
f) from 0 to 17.0899% by weight of component F, in particular 0% by weight of component F;
g) from 0 to 17.0899% by weight of component G, in particular 0% by weight of component G;
h) from 0 to 10% by weight of component H, in particular 0% by weight of component H;
where the entirety of components A to H gives 100% by weight.

In one specific embodiment the composition of the invention comprises
a) from 85.5 to 99.4899% by weight of component A;
b) from 0.2 to 10% by weight of component B;
c) from 0.0001 to 0.5% by weight of component C;
d) from 0.01 to 2% by weight of component D;
e) from 0.3 to 2% by weight of component E;
f) from 0 to 13.9899% by weight of component F, in particular 0% by weight of component F;
g) from 0 to 13.9899% by weight of component G, in particular 0% by weight of component G;
h) from 0 to 10% by weight of component H, in particular 0% by weight of component H;
where the entirety of components A to H gives 100% by weight.

In another specific embodiment the composition of the invention comprises
a) from 92.5 to 99.4899% by weight of component A;
b) from 0.2 to 3% by weight of component B;
c) from 0.0001 to 0.5% by weight of component C;
d) from 0.01 to 2% by weight of component D;
e) from 0.3 to 2% by weight of component E;
f) from 0 to 6.9899% by weight of component F, in particular 0% by weight of component F;
g) from 0 to 6.9899% by weight of component G, in particular 0% by weight of component G;
h) from 0 to 10% by weight of component H, in particular 0% by weight of component H;
where the entirety of components A to H gives 100% by weight.

In another embodiment the composition of the invention comprises
a) from 30 to 99.798989% by weight of component A;
b) from 0.1 to 30% by weight of component B;
c) from 0.000001 to 1% by weight of component C;
d) from 0.00001 to 5% by weight of component D;
e) from 0.1 to 30% by weight of component E;
f) from 0.001 to 69.799989% by weight of component F;
g) from 0 to 69.798989% by weight of component G;
h) from 0 to 10% by weight of component H;
where the entirety of components A to H gives 100% by weight.

In another embodiment the composition of the invention comprises
a) from 30 to 99.798989% by weight of component A;
b) from 0.1 to 30% by weight of component B;
c) from 0.000001 to 1% by weight of component C;
d) from 0.00001 to 5% by weight of component D;
e) from 0.1 to 30% by weight of component E;
f) from 0 to 69.798989% by weight of component F;
g) from 0.001 to 69.799989% by weight of component G;
h) from 0 to 10% by weight of component H;
where the entirety of components A to H gives 100% by weight.

In another embodiment the composition of the invention comprises
a) from 30 to 99.797989% by weight of component A;
b) from 0.1 to 30% by weight of component B;
c) from 0.000001 to 1% by weight of component C;
d) from 0.00001 to 5% by weight of component D;
e) from 0.1 to 30% by weight of component E;
f) from 0.001 to 69.798989% by weight of component F;
g) from 0.001 to 69.798989% by weight of component G;
h) from 0 to 10% by weight of component H;
where the entirety of components A to H gives 100% by weight.

The composition of the invention comprises, as component A, at least one linear or branched polyorganosiloxane comprising at least two alkenyl or alkynyl groups.

It is preferable that the composition of the invention comprises, as component A, at least one linear polyorganosiloxane comprising at least two alkenyl groups. The alkenyl groups are preferably vinyl groups, particularly preferably terminal vinyl groups.

In one preferred embodiment the composition of the invention comprises, as component A, at least one linear polyorganosilxoane of the general formula (IV),

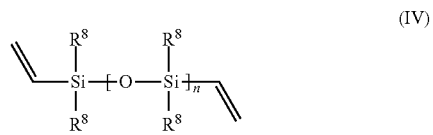

(IV)

where
R⁸ is selected independently from $C_1$-$C_6$-alkyl; and
n is a number from 6 to 1000.

In one particularly preferred embodiment the composition of the invention comprises, as component A, at least one linear polyorganosiloxane of the general formula (IV), where $R^8$ is methyl and n is a number from 6 to 1000.

For the purposes of the present invention the expression "$C_1$-$C_6$-alkyl" means the following group of alkyl groups: methyl, ethyl, n-propyl, isopropyl, n-butyl, isobutyl, sec-butyl, tert-butyl, n-pentyl, 3-methylbutyl, 2-methylbutyl, 1-methylbutyl, 1-ethylpropyl, n-hexyl, 4-methylpentyl, 3-methylpentyl, 2-methylpentyl, 1-methylpentyl, 2-ethylbutyl, 1-ethylbutyl, 1,1-dimethylbutyl, 1,2-dimethylbutyl, 1,3-dimethylbutyl, 2,2-dimethylbutyl, 2,3-dimethyl-butyl, 3,3-dimethylbutyl, 1,1,2-trimethylpropyl, 1,2,2-trimethylpropyl, 1-ethyl-1-methylpropyl, 1-ethyl-2-methylpropyl.

The viscosity of the polyorganosiloxane of component A is generally from 1 to 500 000 mPa·s, preferably from 100 to 100 000 mPa·s, particularly preferably from 100 to 10 000 mPa·s.

The composition of the invention comprises from 30 to 99.799989% by weight, preferably from 50 to 99.69899% by weight, particularly preferably from 80 to 99.5899% by weight, of component A.

In one specific embodiment the composition of the invention preferably comprises from 34 to 99.799989% by weight, particularly from 71 to 99.69899% by weight, very particularly from 82.5 to 99.5899% by weight, of component A.

The composition of the invention comprises, as component B, at least one linear or branched polyorganosiloxane comprising at least 3 Si—H groups.

It is preferable that the composition of the invention comprises, as component B, at least one linear polyorganosiloxane comprising at least 3 Si—H groups.

It is particularly preferable that the composition of the invention comprises, as component B, at least one linear polydimethylsiloxane comprising at least 3 Si—H groups.

The Si—H content of the polyorganosiloxane of component B is generally from 0.5 to 20 mmol/g, preferably from 1 to 10 mmol/g, particularly preferably from 1 to 8 mmol/g, in particular from 4 to 8 mmol/g.

It is very particularly preferable that the composition of the invention comprises, as component B, at least one linear polydimethylsiloxane comprising at least 3 Si—H groups, where the Si—H content of the polydimethylsiloxane is from 4 to 8 mmol/g.

The viscosity of the polyorganosiloxane of component B is generally from 1 to 10 000 mPa·s, preferably from 1 to 1000 mPa·s, particularly preferably from 5 to 100 mPa·s.

The composition of the invention comprises from 0.1 to 30% by weight, preferably from 0.2 to 15% by weight, particularly preferably from 0.2 to 10% by weight, of component B.

The composition of the invention comprises, as component C, at least one hydrosilylation catalyst.

It is preferable that the composition of the invention comprises, as component C, a hydrosilylation catalyst based on a platinum-group metal. For the purposes of the present invention, the expression "platinum-group metals" means the metals ruthenium, rhodium, palladium, osmium, iridium, and platinum. Preference is given to hydrosilylation catalysts based on platinum. Hydrosilylation catalysts that are further preferred are platinum-alkenylsiloxane complexes. Preference is in particular given to the hydrosilylation catalyst selected from the group consisting of platinum-1,3-divinyl-1,1,3,3-tetramethyldisiloxane complex (Karstedt complex), platinum-1,3-diallyl-1,1,3,3-tetramethyl-disiloxane complex, platinum-1,3-divinyl-1,3-dimethyl-1,3-diphenyldisiloxane complex, platinum-1,1,3,3-tetraphenyldisiloxane complex and platinum-1,3,5,7-tetramethyl-1,3,5,7-tetravinylcyclotetrasiloxane complex. It is very particularly preferable that the hydrosilylation catalyst is platinum-1,3-divinyl-1,1,3,3-tetramethyldisiloxane complex (Karstedt complex).

The composition of the invention comprises from 0.000001 to 1% by weight, preferably from 0.00001 to 1% by weight, particularly preferably from 0.0001 to 0.5% by weight, of component C.

The composition of the invention comprises, as component D, at least one inhibitor or moderator selected from the groups D1 and D2:
D1: organic compounds having at least one alkynyl group and at least one hydroxy group;
D2: acyclic or cyclic organosiloxanes having from 1 to 5 Si atoms, comprising at least two alkenyl groups.

The compounds from the group D1 preferably have from 3 to 18 C atoms, particularly preferably from 4 to 16 C atoms, very particularly preferably from 4 to 12 C atoms.

It is preferable that the group D1 consists of organic compounds having precisely one alkynyl group and precisely one hydroxy group.

It is particularly preferable that the group D1 consists of organic compounds having precisely one terminal alkynyl group and precisely one hydroxy group.

In another particular embodiment the group D1 consists of alkynols of the general formula (I),

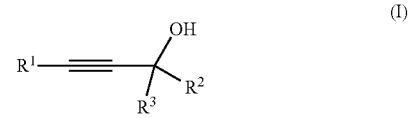

(I)

where
$R^1$, $R^2$, and $R^3$ are selected mutually independently from H, $C_1$-$C_6$-alkyl, and substituted or unsubstituted $C_3$-$C_6$-cycloalkyl; or
$R^1$ is selected from H, $C_1$-$C_6$-alkyl and substituted or unsubstituted $C_3$-$C_6$-cycloalkyl, and $R^2$, $R^3$ are bonded to one another and form a 3- to 8-membered ring which can have substitution by one or more $C_1$-$C_3$-alkyl groups.

For the purposes of the present invention the expression "$C_3$-$C_6$-cycloalkyl" means the following group of cycloalkyl groups: cyclopropyl, cyclobutyl, cyclopentyl, cyclohexyl.

In one embodiment $C_3$-$C_6$-cycloalkyl is unsubstituted or has substitution by one or more $C_1$-$C_1$-alkyl groups.

It is preferable that the group D1 consists of alkynols of the general formula (I), where $R^1$, $R^2$, and $R^3$ are selected mutually independently from H, $C_1$-$C_6$-alkyl, and substituted or unsubstituted $C_3$-$C_6$-cycloalkyl.

It is particularly preferable that the group D1 consists of alkynols of the general formula (I) where $R^1$ is H, $R^2$ is methyl, and $R^3$ is selected from $C_1$-$C_6$-alkyl.

It is very particularly preferable that the group D1 consists of the alkynols 2-methyl-3-butyn-2-ol, and 3,5-dimethyl-1-hexyn-3-ol, in particular of the alkynol 3,5-dimethyl-1-hexyn-3-ol.

It is preferable that the group D2 consists of acyclic or cyclic organosiloxanes having from 2 to 4 Si atoms, comprising at least two alkenyl groups.

It is particularly preferable that the group D2 consists of the organosiloxanes tetramethyldivinyl-siloxane, trimethyl-trivinylcyclotrisiloxane, and tetramethyltetravinylcyclotetrasiloxane.

It is very particularly preferable that the group D2 consists of the organosiloxanes tetramethyldivinylsiloxane, and tetramethyltetravinylcyclotetrasiloxane, in particular of the organosiloxane tetramethyldivinylsiloxane.

The compounds tetramethyldivinylsiloxane, trimethyl-trivinylcyclotrisiloxane, and tetramethyltetravinylcyclotetrasiloxane are depicted below:

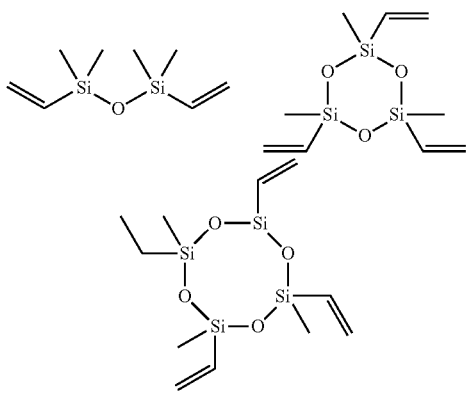

In one embodiment the composition of the invention comprises, as component D, precisely one inhibitor or moderator selected from the groups D1 and D2.

In one embodiment the composition of the invention comprises, as component D, no inhibitor or moderator from the group D2.

In another embodiment the composition of the invention comprises, as component D, precisely one inhibitor or moderator, this being an inhibitor or moderator selected from the group D1.

In one embodiment the composition of the invention comprises, as component D, no inhibitor or moderator from the group D1.

In another embodiment the composition of the invention comprises, as component D, precisely one inhibitor or moderator, this being an inhibitor or moderator selected from the group D2.

In one preferred embodiment the composition of the invention comprises, as component D, at least two inhibitors or moderators selected from the groups D1 and D2.

In another preferred embodiment the composition of the invention comprises, as component D, precisely two inhibitors or moderators selected from the groups D1 and D2.

In one particularly preferred embodiment the composition of the invention comprises, as component D, at least one inhibitor or moderator selected from the group D1, and at least one inhibitor or moderator selected from the group D2.

It is preferable that the ratio of the total of the parts by weight of the at least one inhibitor or moderator selected from the group D1 to the total of the parts by weight of the at least one inhibitor or moderator selected from the group D2 is in the range from 1:1 to 1:50, particularly in the range from 1:5 to 1:20, very particularly in the range from 1:10 to 1:15.

In another particularly preferred embodiment the composition of the invention comprises, as component D, precisely one inhibitor or moderator selected from the group D1, and precisely one inhibitor or moderator selected from the group D2.

It is preferable that the ratio by weight of the inhibitor or moderator selected from the group D1 to the inhibitor or moderator selected from the group D2 is in the range from 1:1 to 1:50, particularly in the range from 1:5 to 1:20, very particularly in the range from 1:10 to 1:15.

The composition of the invention comprises from 0.00001 to 5% by weight, preferably from 0.001 to 3% by weight, particularly preferably from 0.01 to 2% by weight, of component D.

The activity of the catalyst can be controlled via the concentration of component D.

The composition of the invention comprises, as component E, at least one doped pyrogenic titanium dioxide.

The expression "pyrogenic titanium dioxide" is known to the person skilled in the art. Pyrogenic titanium dioxide can by way of example be produced by flame hydrolysis of titanium tetrachloride. An example of a pyrogenic titanium dioxide obtainable commercially is AEROXIDE® $TiO_2$ P 25 from Evonik.

The expression "doped pyrogenic titanium dioxide" is known to the person skilled in the art. Doped pyrogenic titanium dioxide can by way of example be produced by flame hydrolysis of titanium tetrachloride and of another chloride (in accordance with the doping). It is possible by way of example to use iron trichloride as other chloride for the production of iron-doped pyrogenic titanium dioxide. An example of an iron-doped pyrogenic titanium dioxide obtainable commercially is AEROXIDE® $TiO_2$ PF 2 from Evonik.

In one preferred embodiment the composition of the invention comprises, as component E, at least one doped pyrogenic titanium dioxide selected from the group consisting of iron-doped pyrogenic titanium dioxide, aluminum-doped pyrogenic titanium dioxide, cerium-doped pyrogenic titanium dioxide, and zirconium-doped pyrogenic titanium dioxide.

In one particularly preferred embodiment the composition of the invention comprises, as component E, at least one iron-doped pyrogenic titanium dioxide.

Iron-doped pyrogenic titanium dioxide can by way of example be produced by flame hydrolysis of titanium tetrachloride and iron trichloride.

The ratio by weight of iron to titanium in the iron-doped pyrogenic titanium dioxide is preferably in the range from 0.0001 to 0.1, particularly preferably in the range from 0.001 to 0.1, very particularly preferably in the range from 0.01 to 0.05.

In one preferred embodiment the iron content of the iron-doped pyrogenic titanium dioxide is from 0.01 to 10% by weight, particularly from 0.1 to 10% by weight, very particularly from 1 to 5% by weight, in particular from 1 to 2% by weight.

In another preferred embodiment the iron oxide content of the iron-doped pyrogenic titanium dioxide is from 0.01 to 10% by weight, particularly from 0.1 to 10% by weight, very particularly from 1 to 5% by weight, in particular from 1 to 3% by weight.

The specific surface area (determined by the BET method) of the doped, preferably iron-doped, pyrogenic titanium dioxide of component E is generally from 30 to 400 $m^2/g$, preferably from 30 to 200 $m^2/g$, particularly preferably from 35 to 100 $m^2/g$, very particularly preferably from 35 to 80 $m^2/g$.

The average particle size of the doped, preferably iron-doped, pyrogenic titanium dioxide of component E is generally from 10 to 300 nm, preferably from 10 to 200 nm, particularly preferably from 10 to 100 nm, very particularly preferably from 10 to 50 nm.

The tamped density (determined in accordance with DIN EN ISO 787/11) of the doped, preferably iron-doped, pyrogenic titanium dioxide of component E is generally from 10 to 500 g/l, preferably from 30 to 200 g/l, particularly preferably from 50 to 150 g/l, very particularly preferably from 80 to 120 g/l.

The composition of the invention comprises from 0.1 to 30% by weight, preferably from 0.1 to 10% by weight, particularly preferably from 0.2 to 5% by weight, of component E.

In one specific embodiment the composition of the invention comprises from 0.3 to 2% by weight of component E.

The composition of the invention optionally comprises one or more linear or branched polyorganosiloxanes comprising two terminal Si—H groups, or one terminal Si—H group and one terminal alkenyl group, as component F.

It is preferable that component F is one or more linear polyorganosiloxanes comprising two terminal Si—H groups, or one terminal Si—H group and one terminal alkenyl group.

In one preferred embodiment component F is one or more polyorganosiloxanes of the general formula (II),

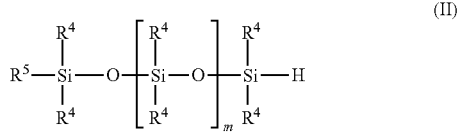

(II)

where
R$^4$ is selected independently from C$_1$-C$_6$-alkyl;
R$^5$ is selected from H and C$_2$-C$_6$-alkenyl; and
m is a number from 1 to 400.
R$^4$ is preferably methyl.
R$^5$ is preferably H or vinyl.
m is preferably a number from 2 to 400.

In one particularly preferred embodiment component F is one or more polyorganosiloxanes of the general formula (II), where R$^4$ is methyl, R$^5$ is H or vinyl, and m is a number from 2 to 400.

For the purposes of the present invention the expression "C$_2$-C$_6$-alkenyl" means the following group of alkenyl groups: vinyl, allyl, methallyl, 1-methylallyl, homoallyl, cis-but-2-enyl, trans-but-2-enyl, cis-pent-1-enyl, trans-pent-1-enyl, cis-pent-2-enyl, trans-pent-2-enyl, cis-pent-3-enyl, trans-pent-3-enyl, cis-1-methylbut-1-enyl, trans-1-methylbut-1-enyl, cis-2-methylbut-1-enyl, trans-2-methylbut-1-enyl, cis-3-methylbut-1-enyl, trans-3-methylbut-1-enyl, cis-1-methylbut-2-enyl, trans-1-methylbut-2-enyl, cis-2-methylbut-2-enyl, trans-2-methylbut-2-enyl, 3-methyl-but-2-enyl, 1-methylbut-3-enyl, 2-methylbut-3-enyl, 3-methylbut-3-enyl, cis-1-ethylprop-1-enyl, trans-1-ethylprop-1-enyl, 1-ethylprop-2-enyl, cis-hex-1-enyl, trans-hex-1-enyl, cis-hex-2-enyl, trans-hex-2-enyl, cis-hex-3-enyl, trans-hex-3-enyl, cis-hex-4-enyl, trans-hex-4-enyl, hex-5-enyl, cis-1-methylpent-1-enyl, trans-1-methylpent-1-enyl, cis-2-methylpent-1-enyl, trans-2-methylpent-1-enyl, cis-3-methylpent-1-enyl, trans-3-methylpent-1-enyl, cis-4-methylpent-1-enyl, trans-4-methylpent-1-enyl, cis-1-methylpent-2-enyl, trans-1-methylpent-2-enyl, cis-2-methylpent-2-enyl, trans-2-methylpent-2-enyl, cis-3-methylpent-2-enyl, trans-3-methylpent-2-enyl, cis-4-methylpent-2-enyl, trans-4-methylpent-2-enyl, cis-1-methylpent-3-enyl, trans-1-methylpent-3-enyl, cis-2-methylpent-3-enyl, trans-2-methylpent-3-enyl, cis-3-methylpent-3-enyl, trans-3-methylpent-3-enyl, 4-methyl-pent-3-enyl, 1-methylpent-4-enyl, 2-methylpent-4-enyl, 3-methylpent-4-enyl, 4-methylpent-4-enyl, cis-1,2-dimethylbut-1-enyl, trans-1,2-dimethylbut-1-enyl, cis-1,3-dimethylbut-1-enyl, trans-1,3-dimethylbut-1-enyl, cis-3,3-dimethylbut-1-enyl, trans-3,3-dimethylbut-1-enyl, cis-1,1-dimethylbut-2-enyl, trans-1,1-dimethylbut-2-enyl, cis-1,2-dimethylbut-2-enyl, trans-1,2-dimethylbut-2-enyl, cis-1,3-dimethylbut-2-enyl, trans-1,3-dimethylbut-2-enyl, cis-2,3-dimethylbut-2-enyl, trans-2,3-dimethylbut-2-enyl, 1,1-dimethylbut-3-enyl, 1,2-dimethylbut-3-enyl, 1,3-dimethylbut-3-enyl, 2,2-dimethylbut-3-enyl, 2,3-dimethylbut-3-enyl.

The viscosity of the polyorganosiloxane of component F is generally from 1 to 10 000 mPa·s, preferably from 10 to 1000 mPa·s, particularly preferably from 10 to 50 mPa·s.

The composition of the invention comprises from 0 to 69.799989% by weight, preferably from 0 to 49.69899% by weight, particularly preferably from 0 to 19.5899% by weight, of component F.

In one specific embodiment the composition of the invention preferably comprises from 0 to 65.799989% by weight, particularly from 0 to 28.69899% by weight, very particularly from 0 to 17.0899% by weight, of component F.

In one embodiment the composition of the invention comprises 0% by weight of component F.

The composition of the invention optionally comprises one or more other linear or branched polyorganosiloxanes as component G.

It is preferable that component G is one or more linear polyorganosiloxanes.

It is particularly preferable that component G is one or more linear polydimethylsiloxanes.

In one preferred embodiment component G is one or more polyorganosiloxanes of the general formula (III),

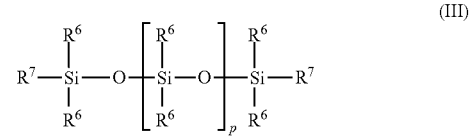

(III)

where
R$^6$ is selected independently from C$_1$-C$_6$-alkyl;
R$^7$ is selected independently from C$_1$-C$_6$-alkyl; and
p is a number from 1 to 2000.
R$^6$ is preferably methyl.
R$^7$ is preferably methyl.
p is preferably a number from 10 to 1000, in particular a number from 10 to 900.

In one particularly preferred embodiment component G is one or more polyorganosiloxanes of the general formula (II) where R$^6$ is methyl, R$^7$ is methyl, and p is a number from 10 to 900.

The viscosity of the polyorganosiloxane of component G is generally from 1 to 100 000 mPa·s, preferably from 10 to 10 000 mPa·s.

The composition of the invention comprises from 0 to 69.799989% by weight, preferably from 0 to 49.69899% by weight, particularly preferably from 0 to 19.5899% by weight, of component G.

In one specific embodiment the composition of the invention preferably comprises from 0 to 65.799989% by weight, particularly from 0 to 28.69899% by weight, very particularly from 0 to 17.0899% by weight, of component G.

In one embodiment the composition of the invention comprises 0% by weight of component G.

The composition of the invention optionally comprises one or more additives as component H.

The additives of component H are in particular conventional additives.

It is preferable that component H is one or more additives selected from the group consisting of pigments, dyes, adhesion promoters, flame retardants, UV stabilizers, and UV fluorescence markers.

The composition of the invention comprises from 0 to 10% by weight, preferably from 0 to 10% by weight, particularly preferably from 0 to 10% by weight, of component H.

In one embodiment the composition of the invention comprises 0% by weight of component H.

The molar ratio of Si—H groups to Si-alkenyl groups in the composition of the invention is preferably in the range from 0.3 to 5, particularly preferably from 0.3 to 2, very particularly preferably in the range from 0.3 to 1.5.

The shear viscosity of the composition of the invention is generally at most 100 000 mPa·s at a shear rate of 10 s$^{-1}$. It is preferable that the shear viscosity of the composition of the invention is at most 10 000 mPa·s at a shear rate of 10 s$^{-1}$.

For the purposes of the present invention the term "viscosity" always means the dynamic viscosity ($\eta$), the unit for which is N·s·m$^{-2}$=Pa·s or mN·s·m$^{-2}$=mPa·s.

The expression "shear viscosity" means the same as the term "viscosity". The expression "shear viscosity" is used instead of the term "viscosity" in particular when the viscosity stated is based on a particular shear rate. This is then intended merely to indicate that the viscosity changes as a function of the shear rate.

The viscosity can be determined by a wide variety of methods known to the person skilled in the art. By way of example, the dynamic viscosity can be determined with the aid of a capillary viscometer, a falling-ball viscometer, or a rotary rheometer. A comprehensive description of viscosity determination is found in Meichsner, G./Mezger, T. G./Schröder, J. (1997) Lackeigenschaften messen und steuern [Measurement and control of properties of coating materials], in Zorll, U. (ed.), Rheometrie [Rheometry] (pp. 50-81). Hanover: Vincenz. Unless expressly otherwise stated, the viscosities mentioned in the present application were determined in an oscillation/rotation rheometer (MCR-302 from Anton Paar).

Unless expressly otherwise stated, all viscosities listed in this application are based on room temperature (23° C.)

In order to achieve a further improvement in the stability of the composition of the invention in storage, it is possible to divide components A to E and, where appropriate, F to H into two partial mixtures, where component C is added to a partial mixture different from that to which component B and, where appropriate, component F is/are added. The two partial mixtures can by way of example be mixed with one another briefly prior to use thereof.

The invention also provides a process for the application of a protective coating to an electrical or electronic component or device, comprising the following steps:
a) provision of a composition according to the invention;
b) application of the composition to an electrical or electronic component or device; and
c) curing of the composition applied, thus forming the protective coating.

The application in step b) is generally achieved via conventional methods known to the person skilled in the art. Examples of these methods are vacuum casting and other casting methods.

The curing in step c) can take place at room temperature. It is preferable that the curing in step c) is achieved by heating.

If curing is achieved by heating, this is generally achieved by conventional methods known to the person skilled in the art. It is possible to use an oven or electromagnetic radiation, for example.

It is preferable that the composition applied is cured at a temperature from room temperature to 250° C., particularly from room temperature to 150° C.

The layer thickness of the protective coating applied by the process of the invention is generally from 0.01 to 30 cm, preferably from 0.1 to 30 cm.

The process of the invention is in particular suitable for the application of a protective coating to electrical or electronic components or devices having long-term exposure to temperatures ≥150° C.

In particular, the process of the invention is also suitable for the application of a protective coating to IGBTs (insulated gate bipolar transistors), control modules, circuit boards, and semiconductors, in particular in the motor vehicle sector and power electronics sector. The process of the invention can also be used for high-voltage applications.

The invention further provides the use of a composition of the invention for the application of a protective coating to an electrical or electronic component or device.

The invention also provides a protective coating on an electrical or electronic component or device, obtainable via the process of the invention.

The invention further provides an electrical or electronic component or device with, applied thereto, a protective coating of the invention or a protective coating obtainable via the process of the invention.

The examples below provide further explanation of the invention.

EXAMPLES

All of the mixtures listed below were charged to an aluminum dish and heated to 120° C. for 72 hours to achieve complete crosslinking. The dish was then stored in a convection oven at 206° C. Gas emission was monitored here during the storage time. To this end, penetration hardness and/or loss of mass were determined at intervals.

Penetration hardness was measured in accordance with DIN EN ISO 2137 with a PNR10 Petrotest device. The penetration head is a ¼-scale cone.

The polymer VS 2000 from Hanse Evonik was used as component A in the inventive examples and comparative examples. This is a linear polydimethylsiloxane which has a vinyl group at both ends.

Crosslinker 1595H7 from BRB International B.V. was used as component B in the inventive examples and comparative examples. This is a linear polydimethylsiloxane with 7 mmol/g Si—H content.

Inventive examples 1 to 3 used, as component E, the iron-doped pyrogenic titanium dioxide AEROXIDE® TiO$_2$ PF 2 from Evonik.

Comparative Example 1

A mixture of 1985.42 parts by weight of a divinylpolydimethylsiloxane with a viscosity 2000 mPa·s (component A), 13.5 parts by weight of a polydimethylsiloxane with 7 mmol/g Si—H content (component B), 0.08 part by weight of 3,5-dimethyl-1-hexyn-3-ol (component D), and 1 part by weight of a 1% solution of Karstedt complex (component C) in 1,2-divinyltetramethyldisiloxane (component D) was thoroughly mixed. The mixture was then crosslinked at 206° C. for 72 hours. Loss of mass was determined during storage at 206° C.

Inventive Example 1

A mixture of 1985.42 parts by weight of a divinylpoly-dimethylsiloxane with a viscosity 2000 mPa·s (component A), 13.5 parts by weight of a polydimethylsiloxane with 7 mmol/g Si—H content (component B), 0.08 part by weight of 3,5-dimethyl-1-hexyn-3-ol (component D), 1 part by weight of a 1% solution of Karstedt complex (component C) in 1,2-divinyltetramethyldisiloxane (component D), and 10 parts by weight of an iron-doped pyrogenic titanium dioxide (component E) was thoroughly mixed. The mixture was then crosslinked at 206° C. for 72 hours. Penetration hardness and loss of mass were determined during storage at 206° C.

FIG. 1 plots the loss of mass in % (ordinate) of inventive example 1 and comparative example 1 during storage at 206° C. against storage time in days (abscissa). The loss of mass at the juncture x is based on the mass at the juncture 0, i.e. on the juncture at which storage at 206° C. begins, and is calculated as follows:

Loss in mass in % (at juncture $x$)={[mass (at juncture 0)−mass (at juncture $x$)]/mass (at juncture 0)}·100

From FIG. 1 it can be seen that the loss of mass in inventive example 1 is markedly smaller than in comparative example 1, i.e. that the use of iron-doped pyrogenic titanium dioxide markedly reduces the loss of mass.

Comparative Example 2

A mixture of 1985.42 parts by weight of a divinylpoly-dimethylsiloxane with a viscosity 2000 mPa·s (component A), 13.5 parts by weight of a polydimethylsiloxane with 7 mmol/g Si—H content (component B), 0.08 part by weight of 3,5-dimethyl-1-hexyn-3-ol (component D), 1 part by weight of a 1% solution of Karstedt complex (component C) in 1,2-divinyltetramethyldisiloxane (component D), and 10 parts by weight of undoped pyrogenic titanium dioxide was thoroughly mixed. The mixture was then crosslinked at 206° C. for 72 hours. Penetration hardness was determined during storage at 206° C.

Figure 2:
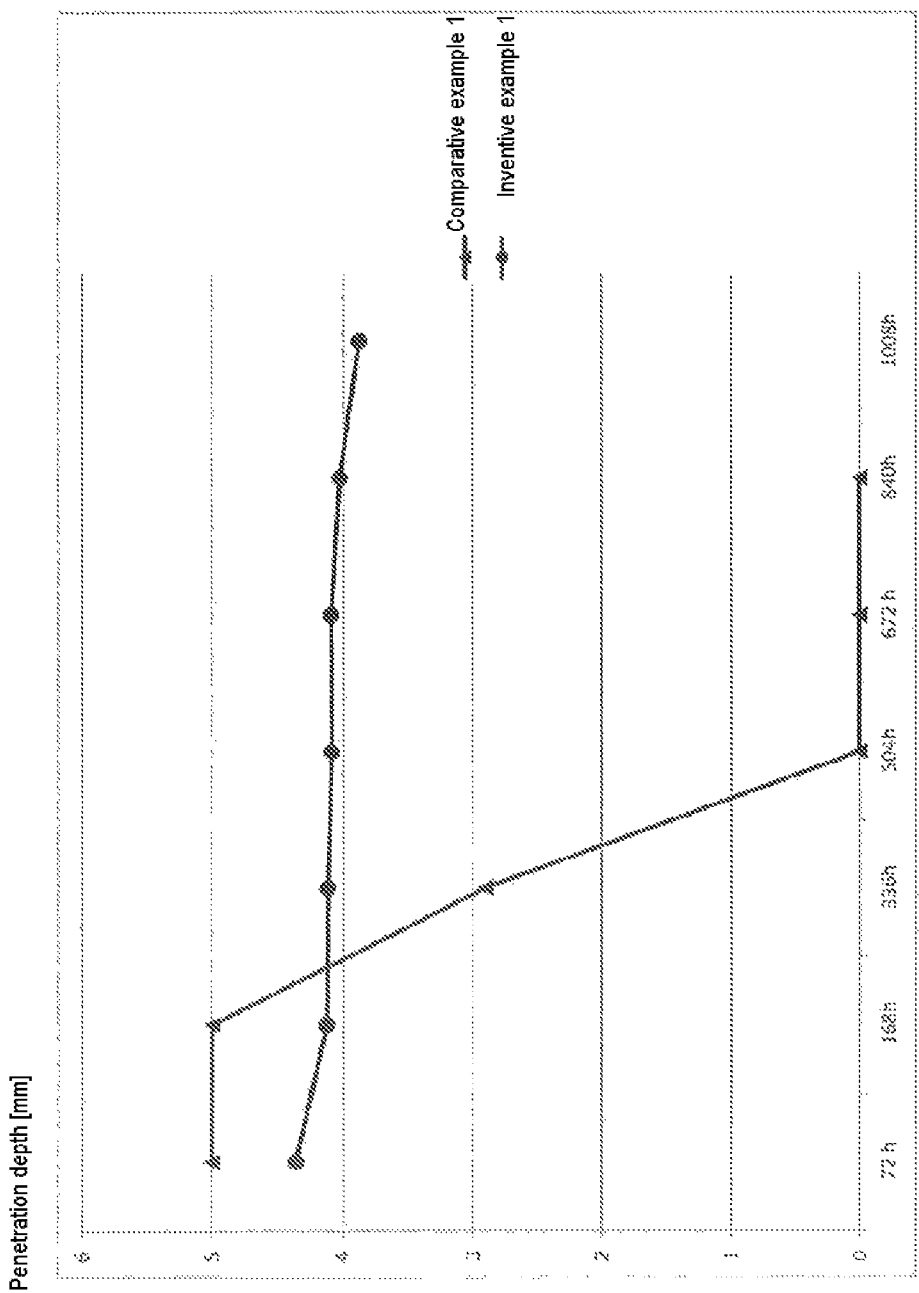
FIG. 2 is a diagram in which the penetration depth in inventive example 1 and comparative example 2 during storage at 206° C. is plotted against storage time.

FIG. 2 plots penetration depth in mm (ordinate) of inventive example 1 and comparative example 2 during storage at 206° C. against storage time in hours (abscissa).

From FIG. 2 it can be seen that the iron-doped pyrogenic titanium dioxide is more effective than the undoped pyrogenic titanium dioxide in preventing an increase of penetration hardness.

Inventive Example 2

A mixture of 1985.42 parts by weight of a divinylpoly-dimethylsiloxane with a viscosity 2000 mPa·s (component A), 13.5 parts by weight of a polydimethylsiloxane with 7 mmol/g Si—H content (component B), 0.08 part by weight of 3,5-dimethyl-1-hexyn-3-ol (component D), 1 part by weight of a 1% solution of Karstedt complex (component C) in 1,2-divinyltetramethyldisiloxane (component D), and 20 parts by weight of an iron-doped pyrogenic titanium dioxide (component E) was thoroughly mixed. The mixture was then crosslinked at 206° C. for 72 hours. Penetration hardness was determined during storage at 206° C.

Inventive Example 3

A mixture of 1985.42 parts by weight of a divinylpoly-dimethylsiloxane with a viscosity 2000 mPa·s (component A), 13.5 parts by weight of a polydimethylsiloxane with 7 mmol/g Si—H content (component B), 0.08 part by weight of 3,5-dimethyl-1-hexyn-3-ol (component D), 1 part by weight of a 1% solution of Karstedt complex (component C) in 1,2-divinyltetramethyldisiloxane (component D), and 30 parts by weight of an iron-doped pyrogenic titanium dioxide (component E) was thoroughly mixed. The mixture was then crosslinked at 206° C. for 72 hours. Penetration hardness was determined during storage at 206° C.

FIG. 3 plots penetration depth in mm (ordinate) of inventive examples 1 to 3 during storage at 206° C. against storage time in hours (abscissa).

From FIG. 3 it can be seen that there is an ideal concentration for the iron-doped pyrogenic titanium dioxide. If this is exceeded, oxidative degradation is increased, and hardness increases. This behavior is surprising and was not foreseeable.

What is claimed is:
1. A composition comprising
a) from 30 to 99.799989% by weight of at least one linear or branched polyorganosiloxane comprising at least two alkenyl or alkynyl groups, as component A;
b) from 0.1 to 30% by weight of at least one linear or branched polyorganosiloxane comprising at least 3 Si—H groups, as component B;
c) from 0.000001 to 1% by weight of at least one hydrosilylation catalyst as component C;
d) from 0.00001 to 5% by weight of at least one inhibitor or moderator selected from the groups D1 and D2, as component D:
  D1: organic compounds having at least one alkynyl group and at least one hydroxy group;
  D2: acyclic or cyclic organosiloxanes having from 1 to 5 Si atoms, comprising at least two alkenyl groups;
e) from 0.2 to 5% by weight of at least one iron-doped pyrogenic titanium dioxide as component E, where the iron content of the iron-doped pyrogenic titanium dioxide is from 0.1 to 10% by weight,
f) from 0 to 69.799989% by weight of one or more linear or branched polyorganosiloxanes comprising two terminal Si—H groups or one terminal Si—H group and one terminal alkenyl group, as component F;
g) from 0 to 69.799989% by weight of one or more other linear or branched polyorganosiloxanes as component G;
h) from 0 to 10% by weight of one or more additives as component H;
where the entirety of components A to H gives 100% by weight.
2. The composition as claimed in claim 1, wherein the composition comprises from 34 to 99.799989% by weight of component A, from 0 to 65.799989% by weight of component F, and from 0 to 65.799989% by weight of component G.
3. The composition as claimed in claim 1, wherein the composition comprises from 34 to 99.799989% by weight of component A, 0% by weight of component F, 0% by weight of component G, and 0% by weight of component H.

4. The composition as claimed in claim 2, wherein the composition consists of components A, B, C, D, and E, where the entirety of components A to E gives 100% by weight.

5. The composition as claimed claim 1, wherein the composition comprises, as component A, at least one linear polyorganosiloxane of the general formula (IV),

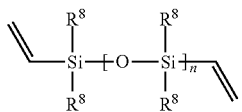

where
$R^8$ is selected independently from $C_1$-$C_6$-alkyl; and
n is a number from 6 to 1000.

6. The composition as claimed in claim 1, wherein the composition comprises, as component B, at least one linear polydimethylsiloxane comprising at least 3 Si—H groups, where the Si—H content of the polydimethylsiloxane is from 4 to 8 mmol/g.

7. The composition as claimed in claim 1, wherein the hydrosilylation catalyst is selected from the group consisting of platinum-1,3-divinyl-1,1,3,3-tetramethyldisiloxane complex (Karstedt complex), platinum-1,3-diallyl-1,1,3,3-tetramethyldisiloxane complex, platinum-1,3-divinyl-1,3-dimethyl-1,3-diphenyldisiloxane complex, platinum-1,1,3,3-tetraphenyldisiloxane complex and platinum-1,3,5,7-tetramethyl-1,3,5,7-tetravinylcyclotetrasiloxane complex.

8. The composition as claimed in claim 1, wherein the group D1 consists of alkynols of the general formula (I),

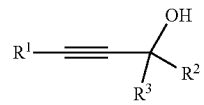

where
$R^1$, $R^2$, and $R^3$ are selected mutually independently from H, $C_1$-$C_6$-alkyl, and substituted or unsubstituted $C_3$-$C_6$-cycloalkyl; or
$R^1$ is selected from H, $C_1$-$C_6$-alkyl and substituted or unsubstituted $C_3$-$C_6$-cycloalkyl, and
$R^2$, $R^3$ are bonded to one another and form a 3- to 8-membered ring which can have substitution by one or more $C_1$-$C_3$-alkyl groups.

9. The composition as claimed in claim 1, wherein the group D2 consists of the organosiloxanes tetramethyldivinylsiloxane, trimethyltrivinylcyclotrisiloxane and tetramethyltetravinylcyclotetrasiloxane.

10. The composition as claimed in claim 1, wherein the composition comprises, as component D, at least one inhibitor or moderator selected from the group D1, and at least one inhibitor or moderator selected from the group D2.

11. The composition as claimed in claim 1, wherein the iron oxide content of the iron-doped pyrogenic titanium dioxide is from 1 to 3% by weight.

12. The composition as claimed in claim 1, wherein component F is one or more polyorganosiloxanes of the general formula (II),

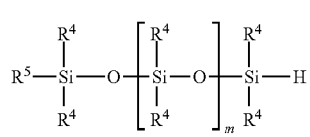

where
$R^4$ is selected independently from $C_1$-$C_6$-alkyl;
$R^5$ is selected from H and $C_2$-$C_6$-alkenyl; and
m is a number from 1 to 400.

13. The composition as claimed in claim 1, wherein component G is one or more polyorganosiloxanes of the general formula (III),

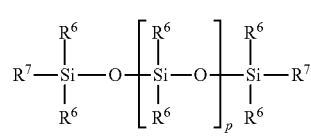

where
$R^6$ is selected independently from $C_1$-$C_6$-alkyl;
$R^7$ is selected independently from $C_1$-$C_6$-alkyl; and
p is a number from 1 to 2000.

14. A process for the application of a protective coating to an electrical or electronic component or device, comprising the following steps:
 a) provision of a composition as claimed in claim 1;
 b) application of the composition to an electrical or electronic component or device; and
 c) curing of the composition applied, thus forming the protective coating.

15. A protective coating on an electrical or electronic component or device, obtainable via the process as claimed in claim 14.

16. An electrical or electronic component or device with, applied thereto, a protective coating as claimed in claim 15.

* * * * *